United States Patent [19]
Porter et al.

[11] 4,178,248
[45] Dec. 11, 1979

[54] NON-CLOGGING MICROPOROUS FILTER WITH CROSS FLOW OPERATION

[75] Inventors: Mark C. Porter, Pleasanton; Wayne P. Olson, San Ramon, both of Calif.

[73] Assignee: Nuclepore Corporation, Pleasanton, Calif.

[21] Appl. No.: 847,584

[22] Filed: Nov. 1, 1977

[51] Int. Cl.² ............................................. B01D 27/06
[52] U.S. Cl. .................................. 210/167; 210/409; 210/433 R; 210/493 R
[58] Field of Search ............... 210/106, 167, 332, 409, 210/433 R, 304, 493 R, 195 S, 197

[56] References Cited
U.S. PATENT DOCUMENTS

| | | | |
|---|---|---|---|
| 1,270,042 | 6/1918 | Moisant | 210/409 X |
| 2,099,502 | 11/1937 | Stockdale | 210/433 R X |
| 3,088,595 | 5/1963 | Robb | 210/304 |
| 3,622,004 | 11/1971 | Meyer | 210/433 R X |
| 3,807,568 | 4/1974 | Ruthrof | 210/433 R X |

Primary Examiner—Charles N. Hart
Assistant Examiner—Richard W. Burks
Attorney, Agent, or Firm—Robert B. Block

[57] ABSTRACT

A microporous filter having pleated filter cartridge is provided with inlet and bypass ports for establishing tangential flow across outside boundary of cartridge inlet side resulting in slow clogging operation.

3 Claims, 5 Drawing Figures

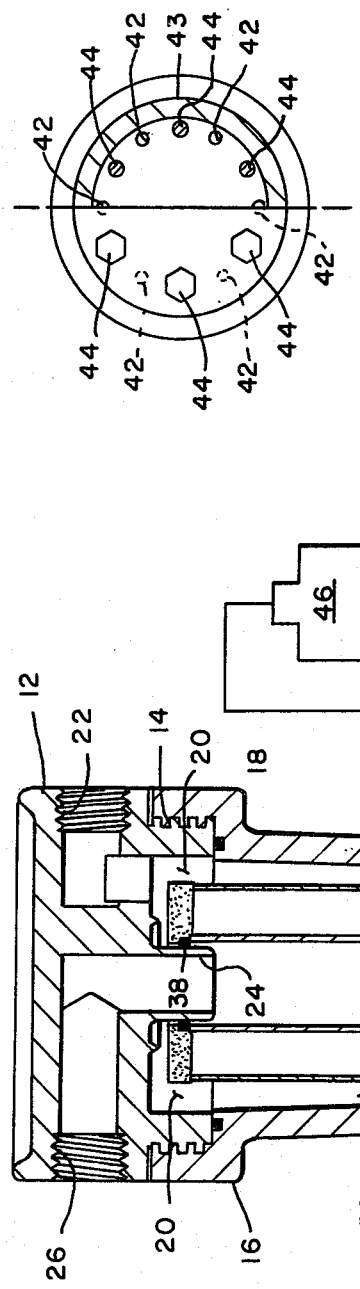
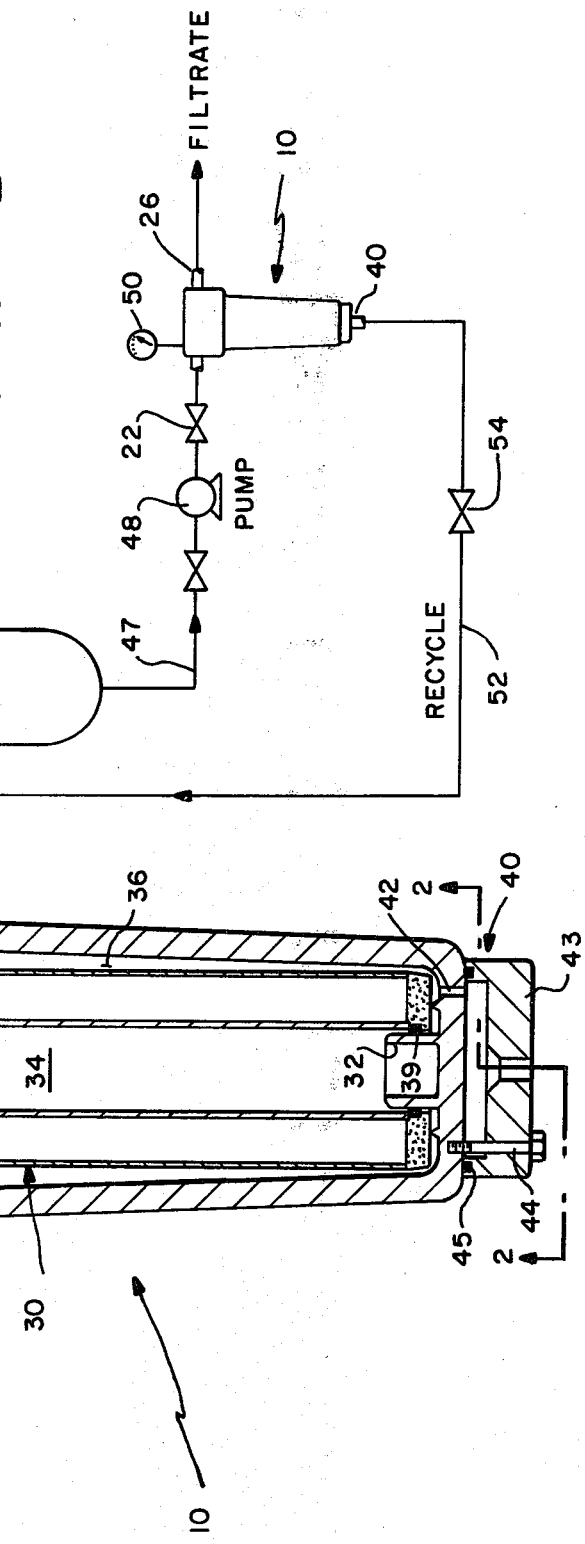

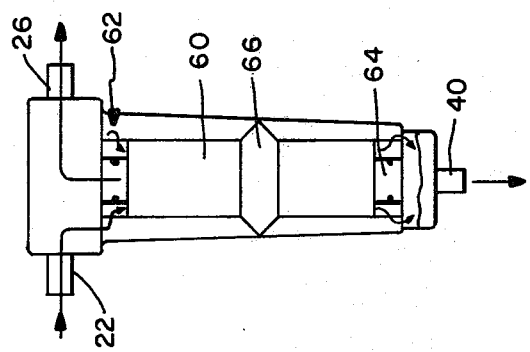
FIG.—5
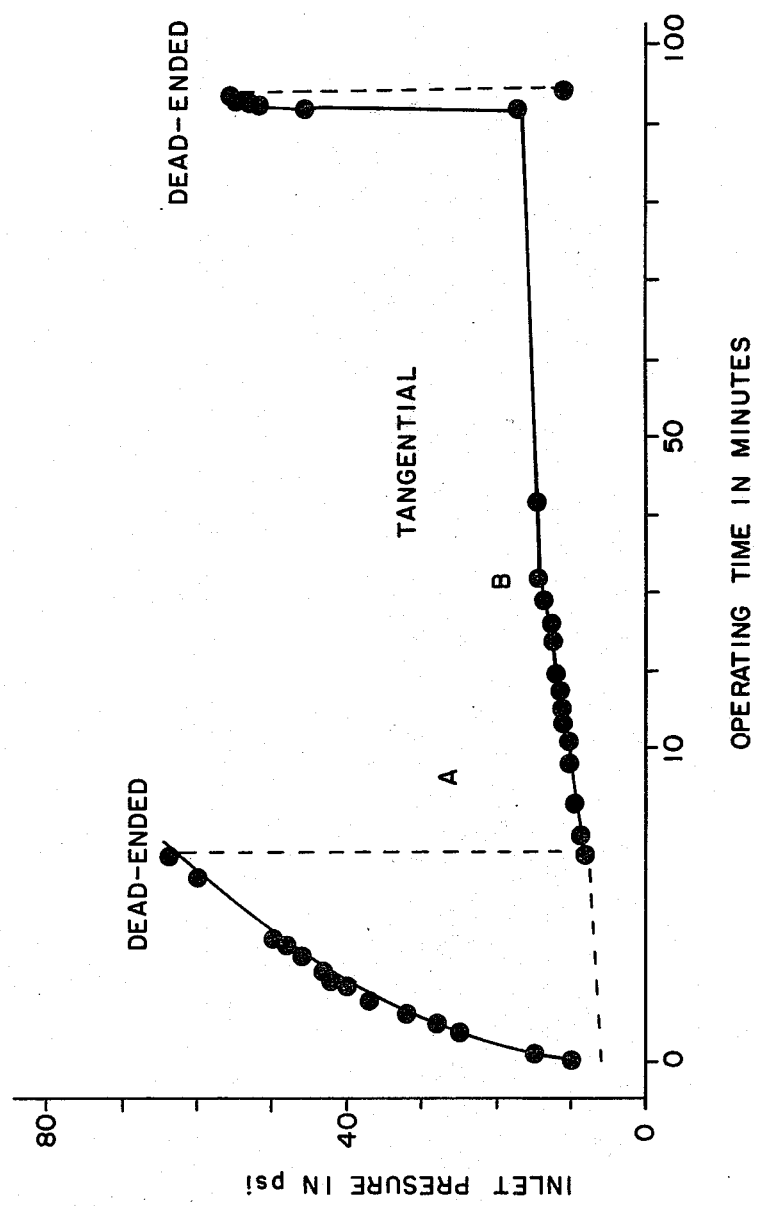
FIG.—4

NON-CLOGGING MICROPOROUS FILTER WITH CROSS FLOW OPERATION

BACKGROUND OF THE INVENTION

This invention relates to microporous filters and in particular to a self-cleaning filter of the type employing a replaceable cartridge. The cartridge is preferably of the form having a pleated structure consisting of a membrane folded back and forth between opposed boundaries, one of which serves as an inlet to material being filtered and the other as the filtrate output.

Microporous filters are defined as those filters with four sizes in the range of 0.02 to 10 $\mu$m. In large volume applications employing microporous filters the operation is generally dead-ended, that is to say, all of the liquid presented to the filter inlet passes through a filter element which may be a membrane and resultant filtrate is withdrawn. In simple one pass flow through the filter, termed "dead-ended" flow, the particles, colloids or other macro-molecules contained within the liquid filter inlet material foul the filter cartridge until significant liquid flow ceases. The evidence of such cessation can be measured as a rise in inlet pressure. Such fouling occurs whether or not the microporous filters are of the flat filter construction or cartridge construction. The latter generally are cylindrically arranged wherein a shell containing a cylindrical filter cartridge defines together therewith an outer annular inlet chamber having the form of a cylindrical shell and an inner, centrally disposed chamber within the cartridge from which filtrate is withdrawn. Typically, such cartridge filters are of the pleated form in which the filter membrane is folded back and forth between cylindrically concentric boundaries, the outer one of which is located in the inlet chamber and the inner one of which is located in the outlet chamber.

In flat filter constructions tangential or crossflow systems operating with a inlet liquid being directed across the surface of the filter, have been found to improve clogging rates. A proportion (25–90% of the liquid flowing) flowing across the filter is either recycled or run to drain but in its path sweeps clogging particles and other foulants from the filter surface and thereby avoids clogging. In the use of microporous filters in filtration of blood fractions, a severalfold increase in throughput (i.e., volume of liquid that can be filtered before flow ceases or becomes uneconomic) occurs when liquid flow is arranged tangentially across the inlet surface rather than dead-ended.

It has now been found that cartridge filters can be operated in a tangential mode resulting in significant increases in throughput and reductions in filtration costs. Unexpectedly, cartridge filters of the type having a pleated construction which is folded between concentric cylindrical boundaries are found to respond to tangential flow operation even when such cartridges are disposed and operated in a filter construction in which the inlet side is generally open to the entire inlet chamber. The present invention discloses a particular form of structure and operation of such cartridge filters which has been found particularly satisfactory. Accordingly, it has been found that when a percentage of the inlet flow is taken across the inlet side of the filter cartridge in a tangential pattern and recycled to the input the commonly observed rapid filter element plugging and caking on the inlet side is greatly reduced. In many cases this reduction is sufficient to cause the filter to operate in nearly steady filtering state mode for a time very long in comparison with the time that the filter would operate normally in dead-ended configuration.

OBJECTS OF THE INVENTION

In general, it is an object of the present invention to provide an improved cartridge filter which has improved clogging characteristics.

A further object of the invention is to provide a specific cartridge filter of the type employing a standard filter cartridge of pleated form.

The foregoing objects have been achieved in a filter structure of the cartridge type and employing a standard pleated form cartridge. The cartridge is characterized by a cylindrical structure in which the inlet and filtrate outlet sides are concentrically disposed in the form of a cylindrical shell. Generally, the outer side of the shell is selected as the inlet side. The cartridge itself is of pleated structure tightly spaced and extending back and forth between the inner cylindrical side and an inlet cylindrical side. The cartridge is disposed in a shell and sealed therein to define two chambers. Seals are located at the upper and lower ends of the cartridge. The inlet through the shell or housing connects to a chamber located in surrounding relationship to the cartridge and around its outwardly facing periphery. An outlet port connects through the shell to the inner or central portion of the cartridge and the chamber associated therewith to receive filtrate that has been passed therethrough. A third port is located in such a way as to provide access to the outer or inlet side of the cartridge at a position remote from the first or inlet port and passes through a control valve back to the inlet side or source of material being passed through the cartridge. The outlet valve in the recycle line permits adjustment of a bypass flow between the first and third ports which flow sweeps past the outer periphery of the cartridge tangentially thereof and provides a sweeping, removal flow which clears the inlet side of the cartridge from clogging material. The foregoing arrangement has been found particularly satisfactory with the pleated form of cartridge both when access to the portions of the membrane enclosed within the boundaries of the pleated structure has not been provided, and when structure is provided for forcing such access.

These and other features and objects of the present invention will become apparent from the following description when taken in conjunction with the accompanying drawings of which:

BRIEF DESCRIPTION OF THE DRAWINGS

FIG. 1 is an elevational view in cross-section of a liquid filter constructed in accordance with the present invention.

FIG. 2 is a cross-sectional view taken along the lines 2—2 of FIG. 1.

FIG. 3 is a schematic diagram of the liquid filter of FIG. 1 as incorporated in a filtering system and shows the connections of inlet, filtrate outlet, and bypass recycle lines, in accordance with the present invention.

FIG. 4 is a graph illustrating a comparison of dead-end and tangential flow operation of the filter of the present invention.

FIG. 5 is a schematic diagram of an alternate filter construction in accordance with the present invention.

DETAILED DESCRIPTION OF THE PREFERRED EMBODIMENT

Referring now to FIGS. 1 and 2, there is shown a detailed structural drawing of the filter and cartridge 10 of the present invention. Thus, there is provided a filter head 12 having a downwardly extending threaded portion 14 adapted for engaging sealably with a shell 16 which is screwed and sealed thereto by means of O-ring 18. The filter head 12 is provided with an upper, annular chamber 20 connecting to an inlet port 22. The other side of the filter head is provided with an outlet port 26 which connects with a nipple 24 extending downwardly and concentrically from the head. The shell is tapered in construction, extending downwardly, and defining a generally elongate cylindrical cavity within which is disposed a filter cartridge 30 of the replaceable type. The shell is closed at its bottom and is provided with an upwardly extending nipple 32 so that the opposed nipples at each end may be engaged by an inwardly facing O ring seal at each end of the filter cartridge. In this way the filter cartridge together with the nipples 24, 32 of the head and shell respectively, define an inner chamber 34 which serves as the filtrate outlet of the device surrounded by the filter cartridge element 30. The shell and head are slightly larger than the cartridge element to define an annular cylindrical chamber 36 surrounding the same which serves as the inlet chamber to the device. It is evident that all flow from the inlet chamber to the outlet chamber must pass through the filter in view of this arrangement and by virtue of O-ring seals 38, 39 between the cartridge and the nipples 24, 32. Typically, this form of cartridge filter is operated in a vertical position substantially as shown in the drawing with the tapered, smaller end of the shell extending downwardly from the filter head.

The filter is of a usual microporous cartridge type and can, for example, be a pleated structure in which the defines an inlet surface and an outlet surface which are spaced apart and between which the filter membrane passes in zig-zag fashion so that a very large filter surface is obtained within a relatively confined volume. The filter is folded into a cylindrical shell and terminated by suitable structural elements which serve together with the pleated structure of the filter itself to form a cartridge. A typical filter may, for example, be a pleaded 0.2 μm (pore size) cartridge filter as supplied under catalog number 61010 from Nuclepore Corporation. A typical filter housing consisting of head and shell and associated equipment may be 720100 of Nuclepore Corporation modified in accordance with the present invention. As used herein, the term filter shell refers broadly to the filter head and lower shell member when connected together to serve as an entire filter housing.

Means are provided for establishing a third outlet port 40 for bypass, tangential flow across the inlet side of the filter cartridge and consists of a plurality of holes 42 disposed about the outer periphery of the bottom of the filter shell and disposed at a position remote from the inlet of said filter. These holes communicate through the bottom of the filter to a manifold cup which is screwed to the bottom in sealing engagement by a plurality of machine screws 44. The manifold cup is provided with an O-ring seal 45 at its upper lip for engaging the bottom of the shell to prevent leakage therefrom.

FIG. 3 shows the apparatus of FIG. 1 connected in a typical operation. Thus, a line 47 is taken from a batch tank 46 source of material to be filtered through suitable pump 48 and delivered to the inlet port 22 of the filter of the present invention at which suitable pressure meter 50 is connected to indicate the inlet head to provide an indication of clogging of the filter unit. Filtrate is taken from the outlet port 26. A recycle line 52 is connected to the bottom of the manifold cup at 40 and returns through a valve 54 which controls a percentage of recycle flow to the inlet of the batch tank. The pump 48 is of the positive displacement type. During operation, particles are swept from the filter surface through the recycle line and returned to the feed and tend to increase the viscosity of the feed and resulting in increase of resistance to flow to the filter. However, the use of the positive displacement pump itself forces more liquid through the recycle line and therefore tends to provide an increase in recycle rate which introduces an additional shear force at the filter surface which tends to sweep away more of the solid cake from the filter. Even though tangential flow generally results in a shear at the filter surface, the favorable operating results of the filter constructed in accordance with the present invention is somewhat unexpected inasmuch as the ratio of the tangential velocity of the fluid down the pleats of the filter cartridge to the velocity of the flow through the pleats is too low ($8 \times 10^{-2}$), to be expected to obtain a favorable result. Normally the expected velocity ratio should be of the order of 10 to $10^6$. In addition, the unexpected results of the present invention also appear in that the fluid shear stress on the membrane is exceedingly low. The calculated value of shear stress in the present invention has been found only to be $10^{-3}$ dynes/cm$^2$. This compares to theoretically effective expected values of the order of 200 dynes/cm$^2$.

FIG. 3 illustrates operation of the present invention in the conventional dead-ended mode when switched through a tangential or cross-flow mode of operation. The pressure indicated at the inlet is that of the upstream or inlet side on a pleated cartridge filter operating at a constant rate of feed, while dead-ended and tangential, as illustrated in the drawing referring to the mode of operation. The broken line between dead-ended flow at A decreasing in pressure when operation is shifted from that mode to tangential mode during continuous operation with the same cartridge in place. The filter did not, during the time shown, approach the point of clogging when operated during tangential mode. The end point is therefore arbitrary at which time the valving in the recycle line was shut off and dead-ended mode reinstituted. The filtered material was a simulated LVP composed of 12% (w/v) dextrose in city water to which was added activated charcoal (approximately 2.5 grams per liter).

Thus, there has been shown an improved form of filter of the microporous type having a cross-flow operation characteristic which permits multiple increases in filtering effectiveness as a function of time with only slight modifications to conventional filter structure in the form of a filter manifold disposed and connected in the manner set forth herein. The results of this operation are remarkable and in view of the low velocity ratios and fluid shear stresses employed, are unexpected.

To those skilled in the art to which this invention pertains, many other adaptations and modifications will occur which should be considered within the scope of the present invention. For example, if it is desired to increase the shear component of flow within the pleats of the filter cartridge structure and to assure that the tangential flow across the structure occurs within the pleats, it is possible to surround the entire filter cartridge with a sleeve 60 as shown in FIG. 5 in close fitting proximity. The sleeve 60 is cylindrical and extends between the cartridge ends but leaves an inlet access ring 62 for tangential and through in-flow at one end together with an outlet access ring 64 for tangential out-flow at the other end. This sleeve may incorporate an outer seal 66 for preventing flow through the surrounding chamber except through the pleated cartridge structure itself. Thus, the scope of the present invention should be taken from the entire disclosure hereof together with the suggestions made and should not be limited except by reference to the accompanying claims of which:

What is claimed is:

1. In a liquid filter, a filter cartridge, a shell for containing said filter cartridge, said cartridge having a set of inner and outer edges on opposite sides thereof defining together with said shell an inlet side for accepting material to be filtered and an outlet side opposite thereof for delivering a filtrate, said cartridge being constructed in a cylindrical pleated form in which the filter material is folded back and forth to define said set of inner and outer edges on opposite sides of the cartridge, the folds of said pleated form defining an inner boundary and an outer boundary for said filter located on concentric cylindrical boundaries, first port means forming an inlet port through said shell to the exterior of said inlet side of said cartridge, second port means forming a filtrate outlet on the other side of said filter cartridge and through said shell, third port means forming a bypass outlet through said shell on the inlet side of said cartridge and at a location remote from said first port means, a cylindrical sleeve surrounding a portion of the length of said cartridge in close fitting proximity to its outer boundary and leaving access rings at each end thereof, and means for preventing flow of liquid between said first inlet port and said third bypass port except between said sleeve and said filter cartridge, means for withdrawing a percentage of inlet liquid from said third port, means forming said bypass outlet to create a flow of liquid tangential to the folds of said filter cartridge on said inlet side, said first port means and third port means are disposed at remote locations so that filterable material passing from the first port means to the third port means flows solely between said inner outer filter cartridge boundaries and along the folds tangentially thereto.

2. A liquid filter as in claim 1 in which said third port means comprises a plurality of bypass passages formed in the end of said shell away from said inlet port and in which said means for withdrawing inlet liquid includes a bypass manifold connected to said shell to receive liquid from said passages.

3. A liquid filter as in claim 2 in which said manifold is in the form of a cup secured in sealing engagement to said shell.

* * * * *